US012607233B2

(12) United States Patent
Roberts et al.

(10) Patent No.: US 12,607,233 B2
(45) Date of Patent: Apr. 21, 2026

(54) THRUST RING FRICTIONAL DAMPER

(71) Applicant: Hamilton Sundstrand Corporation, Charlotte, NC (US)

(72) Inventors: Ethan Roberts, Byron, IL (US); Aaron Cooling, Rockford, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 300 days.

(21) Appl. No.: 18/353,467

(22) Filed: Jul. 17, 2023

(65) Prior Publication Data

US 2025/0027540 A1    Jan. 23, 2025

(51) Int. Cl.
F16D 7/04        (2006.01)

(52) U.S. Cl.
CPC ...... F16D 7/044 (2013.01); *F16D 2250/0084* (2013.01); *F16D 2300/12* (2013.01); *F16D 2300/22* (2013.01)

(58) Field of Classification Search
CPC ..... F16D 7/044; F16D 11/14; F16D 2011/004
See application file for complete search history.

(56) References Cited

U.S. PATENT DOCUMENTS

| | | | | |
|---|---|---|---|---|
| 5,394,967 | A * | 3/1995 | Bigley | ..................... F16D 11/14 192/93 R |
| 8,133,149 | B2 | 3/2012 | Smithson et al. | |
| 8,568,089 | B2 | 10/2013 | Lemmers, Jr. et al. | |
| 10,352,372 | B2 * | 7/2019 | Weidemann | ............ F16D 11/14 |
| 11,085,522 | B2 | 8/2021 | Pritchard et al. | |
| 2011/0299971 | A1 * | 12/2011 | Lemmers, Jr. | .......... F16D 11/14 415/122.1 |
| 2013/0334001 | A1 * | 12/2013 | Albrecht | ................. F16D 11/04 192/69.7 |
| 2014/0008175 | A1 * | 1/2014 | Schneider | ............. F16D 41/206 192/41 S |
| 2015/0167470 | A1 * | 6/2015 | Duijnhouwer | ............ F16D 1/02 403/333 |
| 2018/0045252 | A1 * | 2/2018 | Omori | ..................... F16D 23/06 |
| 2025/0067308 | A1 * | 2/2025 | Lorenz | .................... F16D 23/12 |

FOREIGN PATENT DOCUMENTS

| | | |
|---|---|---|
| EP | 2402560 A1 | 4/2012 |
| EP | 4273417 A1 | 11/2023 |

OTHER PUBLICATIONS

Search Report Issued in European Patent Application No. 24188445.1; Date of Mailing Dec. 12, 2024 (8 pages).

* cited by examiner

*Primary Examiner* — Stacey A Fluhart
(74) *Attorney, Agent, or Firm* — CANTOR COLBURN LLP

(57)        ABSTRACT

A system includes a rotor shaft rotatable about an axis, a disconnect shaft nested at least partially within an interior of the rotor shaft, and a journal shaft selectively rotatably coupled to the disconnect shaft. A vibration damping mechanism is arranged between the rotor shaft and the journal shaft. The vibration damping mechanism includes a thrust journal bearing affixed to the rotor shaft and a thrust washer mounted to the journal shaft. A biasing mechanism is operably coupled to disconnect shaft to bias the thrust washer into frictional engagement with the thrust journal bearing.

19 Claims, 2 Drawing Sheets

THRUST RING FRICTIONAL DAMPER

BACKGROUND

Embodiments of the present disclosure relate to a component having nested shafts, and more particularly, to a vibration damping assembly for damping torsional vibration between the nested shafts.

Many components or systems, such as a drive train or transmission for example, rely on the use of radially nested and coupled shafts to transmit kinetic energy. However, during operation, one of the nested shafts may experience torsional vibration causing the shaft to oscillate relative to the other shaft as the two shafts rotate together about a central axis. Torsional vibration can result in equipment fatigue. In addition, torsional vibration may cause an undesired fluctuation in the rotational speed of a component being driven by the nested shafts.

BRIEF DESCRIPTION

According to an embodiment, a system includes a rotor shaft rotatable about an axis, a disconnect shaft nested at least partially within an interior of the rotor shaft, and a journal shaft selectively rotatably coupled to the disconnect shaft. A vibration damping mechanism is arranged between the rotor shaft and the journal shaft. The vibration damping mechanism includes a thrust journal bearing affixed to the rotor shaft and a thrust washer mounted to the journal shaft. A biasing mechanism is operably coupled to disconnect shaft to bias the thrust washer into frictional engagement with the thrust journal bearing.

In addition to one or more of the features described above, or as an alternative, in further embodiments including a disconnect assembly operably coupled to the disconnect shaft. The disconnect assembly is operable to selectively decouple the disconnect shaft from the journal shaft.

In addition to one or more of the features described above, or as an alternative, in further embodiments one of the journal shaft and the disconnect shaft includes a first clutch tooth assembly and the other of the journal shaft and the disconnect shaft includes a second clutch tooth assembly. The first clutch tooth assembly is receivable within the second clutch tooth assembly to rotatably couple the journal shaft and the disconnect shaft.

In addition to one or more of the features described above, or as an alternative, in further embodiments an input shaft having a first end rotatably coupled to an accessory gearbox. The journal shaft being mounted to a second end of the input shaft for rotation with the input shaft.

In addition to one or more of the features described above, or as an alternative, in further embodiments the input shaft and the journal shaft are rotatably coupled by a plurality of splines.

In addition to one or more of the features described above, or as an alternative, in further embodiments the at least one thrust journal bearing is configured to limit axial movement of the journal shaft.

In addition to one or more of the features described above, or as an alternative, in further embodiments the at least one thrust journal bearing is configured to limit radial movement of the journal shaft.

In addition to one or more of the features described above, or as an alternative, in further embodiments the at least one thrust journal bearing is a carbon-based bearing.

In addition to one or more of the features described above, or as an alternative, in further embodiments including a retaining ring mounted to the journal shaft. The retaining ring is positioned opposite the at least one thrust journal bearing relative to the thrust washer. A spacer is radially aligned with the retaining ring.

In addition to one or more of the features described above, or as an alternative, in further embodiments the thrust washer is arranged in contact with a surface of the retaining ring.

In addition to one or more of the features described above, or as an alternative, in further embodiments the thrust washer is arranged in contact with a surface of the spacer.

In addition to one or more of the features described above, or as an alternative, in further embodiments the vibration damping assembly includes a collar rotatable with the rotor shaft and at least one thrust journal bearing affixed to at least one surface of the collar.

In addition to one or more of the features described above, or as an alternative, in further embodiments the collar is threadably coupled to the rotor shaft.

In addition to one or more of the features described above, or as an alternative, in further embodiments the rotor shaft and the disconnect shaft are rotatably coupled by a plurality of splines.

In addition to one or more of the features described above, or as an alternative, in further embodiments the thrust washer is press fit about the journal shaft.

In addition to one or more of the features described above, or as an alternative, in further embodiments the biasing mechanism is a coil spring.

In addition to one or more of the features described above, or as an alternative, in further embodiments the disconnect shaft includes a flange and the biasing mechanism is arranged in contact with the flange such that a biasing force of the biasing mechanism is transmitted to the flange.

In addition to one or more of the features described above, or as an alternative, in further embodiments the biasing force is an axial force.

According to an embodiment, a method of assembling a vibration damping assembly includes providing a journal shaft and providing a collar and at least one thrust journal bearing affixed to the collar. The collar is connectable to a rotor shaft and the journal shaft being nested within the rotor shaft. The method additionally includes aligning a thrust washer with an end of the journal bearing and pressing the thrust washer onto the journal bearing to a position where the thrust washer is engaged with the at least one thrust bearing.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

A generator, such as a variable frequency generator (VFG), may be used to rotate a component of a turbomachine, such as a gas turbine engine for example, during start-up of the turbomachine. The generator may be a starter configured to accelerate rotation of the component during start-up of the turbomachine and may continue to drive rotation of the component until the component reaches a desired speed.

Figure 1:
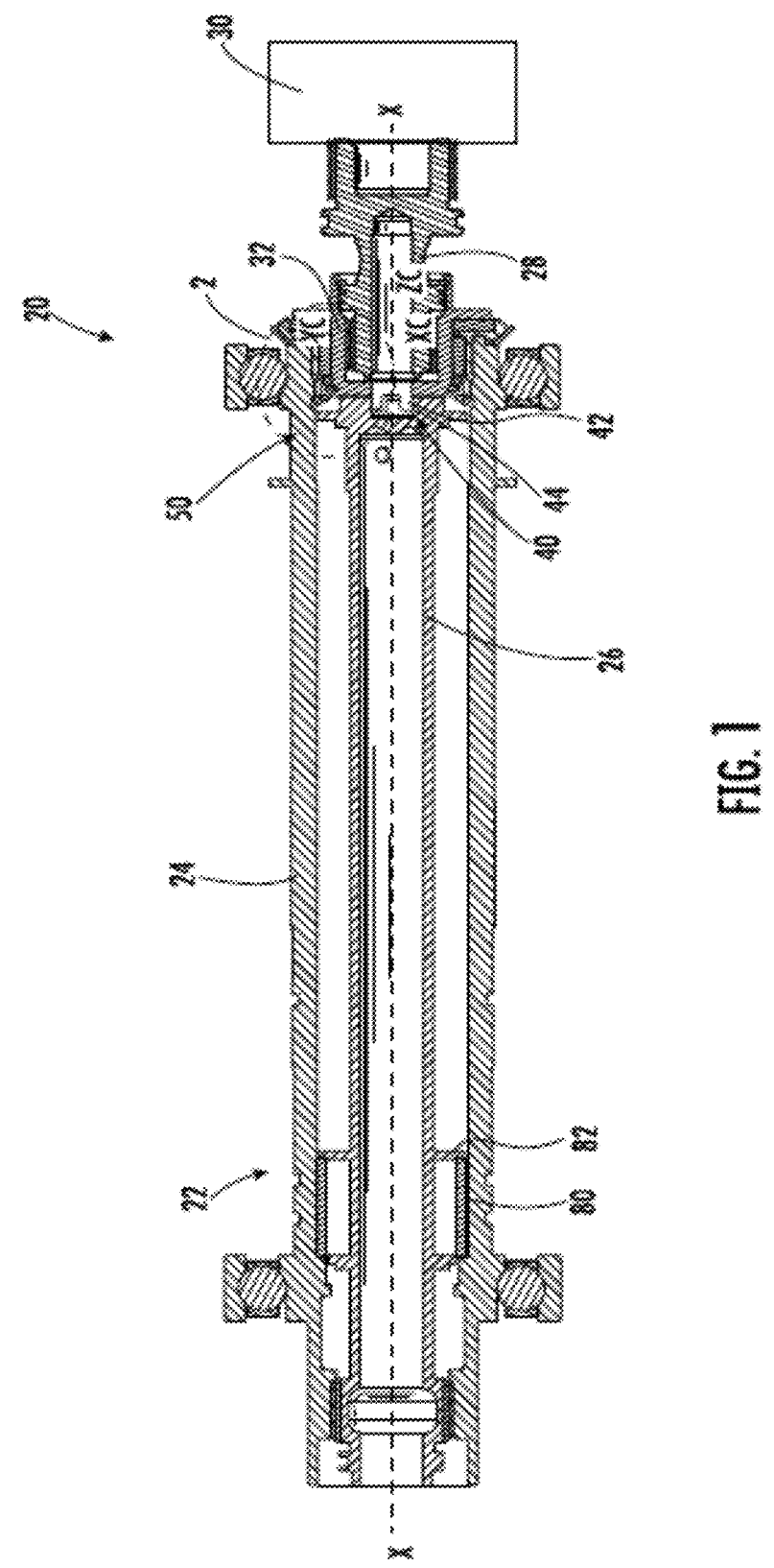
FIG. 1 is a cross-sectional view of a portion of a generator.

Referring now to FIG. 1, a cross-sectional view of an example of a portion of a generator 20 is illustrated. As shown, the portion of the generator 20 includes a rotor 22 including a first rotor shaft 24 and a second, drive or disconnect shaft 26 disposed within and movably coupled to the rotor shaft 24. The disconnect shaft 26 defines a longitudinal central axis X of the rotor 22. In an embodiment, the disconnect shaft 26 is operable not only to rotate about the axis X, but also to translate along the axis X. The disconnect shaft 26 and the rotor shaft 24 are rotatably coupled about axis X, such as via one or more splines for example.

The generator 20 additionally includes an input shaft 28. A second, opposite end of the input shaft 28 may be rotatably coupled to an accessory gearbox, illustrated schematically at 30. As shown, a journal shaft 32 has an opening configured to receive a second, opposite end of the input shaft 28 therein. The journal shaft 32 and the input shaft 28 are configured to rotate in unison. In an embodiment, the journal shaft 32 and the input shaft 28 are rotatably coupled via a spline interface.

With continued reference to FIG. 1, a disconnect assembly 40, such as including a clutch for example, is operable to facilitate engagement and disengagement of the disconnect shaft 26 and the journal shaft 32 by translating the disconnect shaft 26 between a first decoupled position and a second coupled position. In an embodiment, the journal shaft 32 includes a first clutch tooth assembly 42 operable to selectively engage a corresponding second clutch tooth assembly 44 of the disconnect shaft 26. When the first and second clutch tooth assemblies 42, 44 are engaged, the journal shaft 32 and the disconnect shaft 26 are rotatable together about the axis X. During normal operation, the first and second clutch tooth assemblies 42, 44 are typically engaged. However, in response to a failure of the generator, the first clutch tooth assembly 42 of the journal shaft 32 is disengaged from the second clutch tooth assembly 44 of the disconnect shaft 26. Once disengaged, the journal shaft 32 is rotatable about the axis X independently from the disconnect shaft 26.

Figure 2:
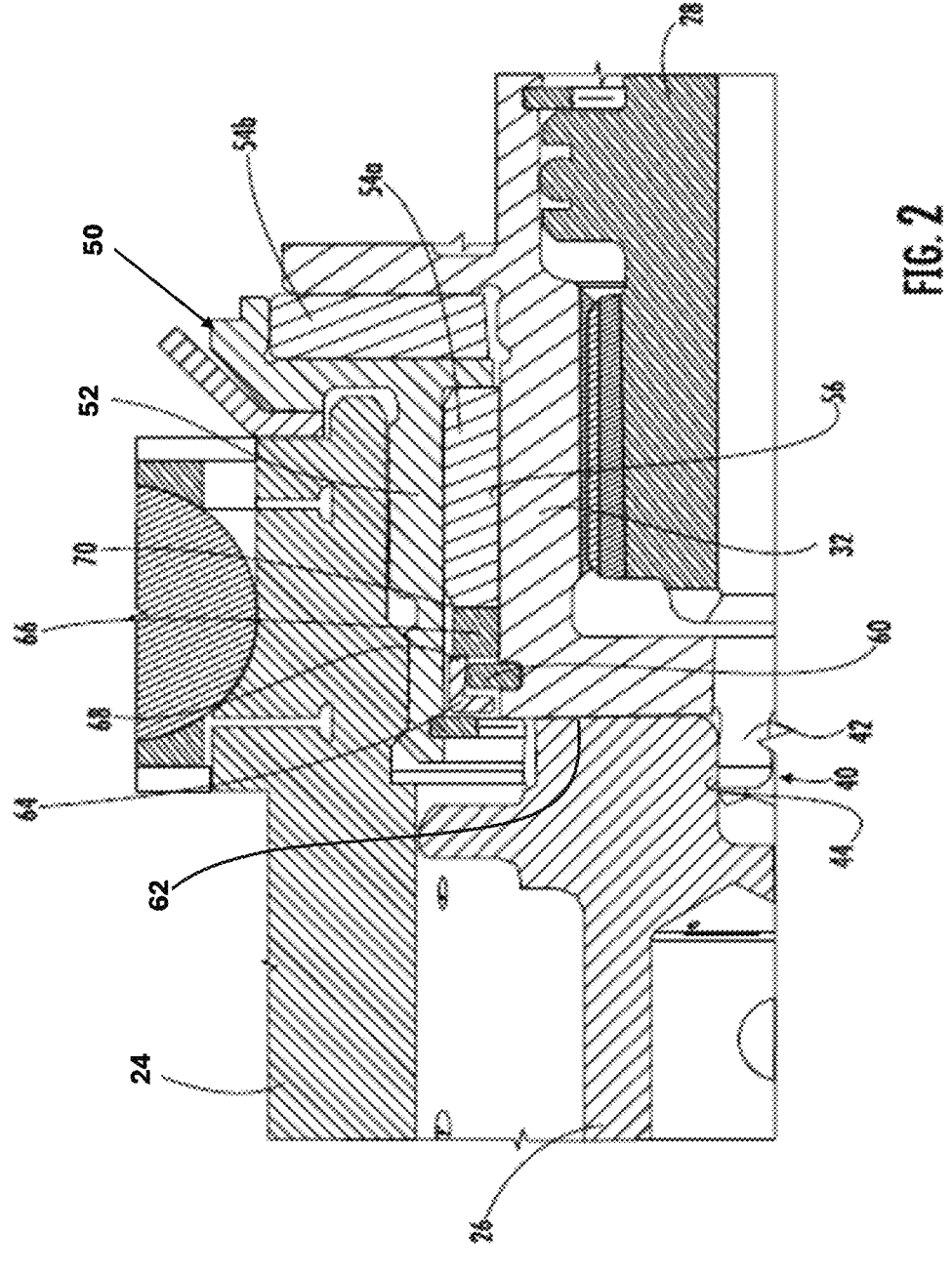
FIG. 2 is a detailed cross-sectional view of a vibration damping assembly arranged at an interface of a rotor shaft and a disconnect shaft of a generator according to an embodiment.

With reference now to FIG. 2, a portion of the generator 20 proximate an interface of the rotor shaft 24 and the disconnect shaft 26, identified in circle 2 of FIG. 1, is illustrated in more detail. In the illustrated, non-limiting embodiment, a vibration damping assembly 50 is arranged between the rotor shaft 24 and the input shaft 28. The vibration damping assembly 50 may include a journal bearing retainer or collar 52 located at the inner periphery of the rotor shaft 24. The collar 52 may be removably coupled or may be permanently affixed to the rotor shaft 24 such that the collar 52 is configured to rotate in unison with the rotor shaft 24. The collar 52 may have an annular body and may include one or more features that facilitate coupling of the collar 52 to the rotor shaft 24. In such embodiments, the features may have a shape and/or size that is complementary to a corresponding feature formed at the inner periphery of the rotor shaft 24. In an embodiment, the collar 52 includes a first plurality of threads, and the rotor shaft 24 includes a second plurality of threads configured to mate with the first plurality of threads. However, it should be understood that the collar 52 may be attached to the rotor shaft 24 via another suitable connection, such as via snap-fit or press-fit connection for example. Further, embodiments where the collar 52 is integrally formed with the rotor shaft 24 are also contemplated herein.

In an embodiment, one or more bearings, such as journal bearings for example, may be arranged in overlapping arrangement with at least a portion of a surface of the collar 52. For example, an axial and/or radial thrust journal bearing 54a may be arranged at an interior surface of the collar 52 and an axial thrust journal bearing 54b may be arranged at an end face of the collar 52 oriented substantially perpendicular to the axis X. In an embodiment, the thrust journal bearings 54a, 54b are carbon-based bearings. The thrust journal bearings 54a, 54b may be fixedly mounted or attached to the collar 52 such that the thrust journal bearings 54a, 54b move, for example rotate, in combination with the collar 52 and the rotor shaft 24 about the axis X.

An exterior surface of the journal shaft 32, such as outer wall 56, is arranged in contact with a surface of the thrust journal bearings 54a, 54b. In an embodiment, the outer wall 56 is arranged in sliding and/or rotational contact with a surface of the thrust journal bearing 54a and a surface 58 of a flange of the journal shaft 32 is arranged in sliding and/or rotational contact with a surface of the thrust journal bearing 54b.

A retaining ring 60 may be mounted about an exterior of the journal shaft 32, such as at a location near the end 62 of the journal shaft 32 positioned closest to the disconnect shaft 26 for example. Similarly, a spacer 64 may be mounted radially outward from the retaining ring 60, at a position between the journal shaft 32 and the collar 52. As shown, at least a portion of the spacer 64 is radially aligned with the retaining ring 60. In the illustrated, non-limiting embodiment, the spacer 64 is generally L-shaped. However, it should be understood that in other embodiments, a spacer 64 having another configuration are also within the scope of the disclosure.

A thrust washer 66 is mounted about the outer wall 56 of the journal shaft 32. The thrust washer 66 is coupled to the journal shaft 32 in any suitable manner such that the thrust washer 66 rotates with the journal shaft 32 about the axis X. An outer diameter of the thrust washer 66 is less than the inner diameter of the collar 52. The thrust washer 66 is generally positioned between the end 68 of the spacer 64 and/or the retaining ring 60 and an end 70 of the first thrust journal bearing 54a. In an embodiment, the thrust washer 66 is press-fit about the journal shaft 32, to a position located between the spacer 64 and the first thrust journal bearing 54a.

In the illustrated, non-limiting embodiment, a biasing mechanism 80, such as a spring for example, is operably coupled to the disconnect shaft 26. As shown, the spring 80 is configured to apply an axial force to the disconnect shaft 26, such as via a flange 82 thereof for example, to bias the disconnect shaft 26 into engagement with the journal shaft 32. The engagement between the thrust washer 66 and a surface of the thrust journal bearing 54a that occurs as a result of this spring force, creates a friction interface between a surface of the thrust washer 66 and the thrust journal bearing 54a.

When the disconnect shaft 26 is carrying torque, such as when the generator is producing electrical power, this disconnect shaft 26 and the journal shaft 32 may have an angle of twist relative to the collar 52. For example, a small rotation of the journal shaft 32 relative to the collar 52 may occur. This relative motion occurs at the interface formed between the thrust washer 66 and the adjacent surface 70 of the thrust journal bearing 54a. The friction generated by movement of the thrust washer 66 relative to the thrust journal bearing 54a dampens the relative movement between the journal shaft 32 and the collar 52. In an embodiment, the friction is sufficient to prevent continuous oscillation of the journal shaft 32 relative to the collar 52.

To assemble the vibration damping assembly, the journal shaft, and the collar having at least one thrust journal bearing affixed thereto are provided to a fixture. The thrust washer is aligned with an end of the journal bearing and is then pressed into a desired position about the journal shaft. In an embodiment, the thrust washer is in the desired position when the thrust washer is engaged with a surface of the at least one thrust bearing.

Although the vibration damping assembly 50 is illustrated and described herein with respect to a generator 20, it should be understood that any component or application having two nested and rotationally coupled shafts, such as a motor, engine, or actuator for example, are also within the scope of the disclosure.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system comprising:
   a rotor shaft rotatable about an axis;
   a disconnect shaft nested at least partially within an interior of the rotor shaft, the disconnect shaft having a radial flange;
   a journal shaft selectively rotatably coupled to the disconnect shaft;
   a vibration damping mechanism arranged between the rotor shaft and the journal shaft, the vibration damping mechanism including a thrust journal bearing affixed to the rotor shaft and a thrust washer mounted to the journal shaft; and
   a biasing mechanism operably coupled to the disconnect shaft to bias the disconnect shaft to move axially toward the journal shaft and bias the thrust washer into frictional engagement with the thrust journal bearing, the biasing mechanism being engaged with the radial flange and a surface of the rotor shaft.

2. The system of claim 1, further comprising a disconnect assembly operably coupled to the disconnect shaft, the disconnect assembly being operable to selectively decouple the disconnect shaft from the journal shaft.

3. The system of claim 2, wherein one of the journal shaft and the disconnect shaft includes a first clutch tooth assembly and the other of the journal shaft and the disconnect shaft includes a second clutch tooth assembly, the first clutch tooth assembly being receivable within the second clutch tooth assembly to rotatably couple the journal shaft and the disconnect shaft.

4. The system of claim 1, further comprising an input shaft having a first end rotatably coupled to an accessory gearbox, the journal shaft being mounted to a second end of the input shaft for rotation with the input shaft.

5. The system of claim 4, wherein the input shaft and the journal shaft are rotatably coupled by a plurality of splines.

6. The system of claim 1, wherein the at least one thrust journal bearing is configured to limit axial movement of the journal shaft.

7. The system of claim 1, wherein the at least one thrust journal bearing is configured to limit radial movement of the journal shaft.

8. The system of claim 1, wherein the at least one thrust journal bearing is a carbon-based bearing.

9. The system of claim 1, further comprising:
   a retaining ring mounted to the journal shaft, the retaining ring being positioned opposite the at least one thrust journal bearing relative to the thrust washer; and
   a spacer radially aligned with the retaining ring.

10. The system of claim 9, wherein the thrust washer is arranged in contact with a surface of the retaining ring.

11. The system of claim 9, wherein the thrust washer is arranged in contact with a surface of the spacer.

12. The system of claim 1, wherein the vibration damping assembly further comprises:
   a collar rotatable with the rotor shaft, the
   thrust journal bearing being affixed to a surface of the collar.

13. The system of claim 12, wherein the collar is threadably coupled to the rotor shaft.

14. The system of claim 1, wherein the rotor shaft and the disconnect shaft are rotatably coupled by a plurality of splines.

15. The system of claim 1, wherein the thrust washer is press fit about the journal shaft.

16. The system of claim 1, wherein the biasing mechanism is a coil spring.

17. The system of claim 1, wherein the biasing force is an axial force.

18. A method of assembling a vibration damping assembly comprising:
   providing a journal shaft;
   providing a collar and at least one thrust journal bearing affixed to the collar, the collar being connectable to a rotor shaft and the journal shaft being nested within the rotor shaft;
   aligning a thrust washer with an end of the journal bearing; and
   pressing the thrust washer onto the journal bearing to a position where the thrust washer is engaged with the at least one thrust bearing.

19. A system comprising:
   a rotor shaft rotatable about an axis;

a disconnect shaft rotatable about the axis and nested with the rotor shaft;

a journal shaft configured to rotate about the axis in unison with the rotor shaft, the journal shaft being selectively couplable to the disconnect shaft;

a vibration damping mechanism arranged between the rotor shaft and the journal shaft, the vibration damping mechanism including a thrust journal bearing affixed to the rotor shaft and a thrust washer mounted to the journal shaft; and a biasing mechanism operably coupled to the disconnect shaft, wherein the thrust washer is biased into engagement with the thrust journal bearing when the disconnect shaft and the journal shaft are coupled.

* * * * *